USO12287833B1

(12) United States Patent
Chia et al.

(10) Patent No.: US 12,287,833 B1
(45) Date of Patent: Apr. 29, 2025

(54) SYSTEMS AND METHODS FOR RANKING USER CAPABILITIES USING MACHINE LEARNING TECHNIQUES

(71) Applicant: Cangrade, Inc., Watertown, MA (US)

(72) Inventors: Katherine Chia, Watertown, MA (US); Gershon Goren, Watertown, MA (US)

(73) Assignee: Cangrade, Inc., Watertown, MA (US)

( * ) Notice: Subject to any disclaimer, the term of this patent is extended or adjusted under 35 U.S.C. 154(b) by 0 days.

(21) Appl. No.: 18/627,018

(22) Filed: Apr. 4, 2024

(51) Int. Cl.
*G06F 16/906* (2019.01)
(52) U.S. Cl.
CPC ................... *G06F 16/906* (2019.01)
(58) Field of Classification Search
CPC .................................................... G06F 16/906
See application file for complete search history.

(56) References Cited

U.S. PATENT DOCUMENTS

| 12,197,859 B1* | 1/2025 | Malviya ................ G06F 40/216 |
| 2005/0096950 A1* | 5/2005 | Caplan ............. G06Q 10/06395 |
| | | 705/7.41 |
| 2017/0060930 A1* | 3/2017 | Elkherj ................. G06F 16/248 |
| 2017/0161664 A1* | 6/2017 | Sahu .................... G06Q 10/1053 |
| 2020/0005194 A1* | 1/2020 | Rao ......................... G06N 20/20 |
| 2020/0257747 A1* | 8/2020 | Efremov ............... G06N 20/00 |
| 2022/0156334 A1* | 5/2022 | De Paolis ............. G06Q 30/02 |
| 2023/0281503 A1* | 9/2023 | Singh ..................... G06N 20/00 |
| | | 706/12 |
| 2024/0257096 A1* | 8/2024 | Doumar ............. G06Q 20/3276 |

* cited by examiner

*Primary Examiner* — Jorge A Casanova
(74) *Attorney, Agent, or Firm* — Morris, Manning & Martin, LLP; Adam J. Thompson, Esq.

(57) ABSTRACT

A sets of capability data can be received by a computing device. The each set of capability data can describe a user. The computing device can apply an artificial intelligence model to the sets of capability data to generate sets of vectors individually representing a respective one of the sets of capability data. The computing device can generate summary vectors individually corresponding to a particular set of the sets of capability data. The computing device can receive requirement data associated with a particular asset. The computing device can generate an asset vector for the particular asset based on the requirement data. The computing device can determine similarity scores individually based on a comparison of a corresponding summary vector of the summary vectors to the asset vector. The computing device can generate a ranking of the users for the particular asset based on the similarity scores.

20 Claims, 6 Drawing Sheets

SYSTEMS AND METHODS FOR RANKING USER CAPABILITIES USING MACHINE LEARNING TECHNIQUES

TECHNICAL FIELD

This application generally relates to systems and methods for ranking users based on their capabilities and more specifically to using machine learning systems to rank users for a particular position based on their capabilities.

BACKGROUND

The field of natural language processing has drastically evolved over the last twenty years. With the advancements in the field, techniques for processing natural language have become more readily available. With that said, many of the current technologies fail to perform at adequate levels for specific use case scenarios. For example, in the field of recruitment, natural language processing system can provide significant benefits for analyzing candidates for particular roles. Unfortunately, many of the current technologies fail to either scale efficiently for larger textual documents or fully capture the nature of the documents submitted for the consideration of a particular position. Additionally, the current technologies fail to effectively generate summarized documents which rank candidates and review a candidates credentials for a particular position.

Therefore, there is a long-felt but unresolved need for a system or method that can efficiently process large amounts of position-specific and applicant-related textual information while maintaining the contextual understanding and semantic nature of the original text to generate summarized documents that rank candidate for a particular position and review their particular capabilities.

BRIEF SUMMARY OF DISCLOSURE

Briefly described, and in various examples, the present disclosure relates to systems and methods for ranking one or more users for a particular position. The disclosed technology can include machine learning techniques for processing capability data associated with a user and requirements data associated with a particular position. The machine learning techniques of the disclosed technology can measure the applicability of a user's capabilities for a particular position and determine if the user is a proper fit for the particular position.

The disclosed technology can include four main components: a Longformer model, a NER tagging system, a cosine similarity calculator, and a large language model (LLM). The Longformer model can include a neural network system used to receive one or more inputs, tokenize the inputs, and generate contextual embeddings for each of the extracted tokens. The NER tagging system can include a classification algorithm used to receive one or more inputs, classify each word in the inputs into position-relevant entities, and generate an entity matching score for the capability data. The cosine similarity calculator can be used to calculate a cosine similarity (also referred to herein as a cosine similarity score), where the cosine similarity measures the correlation between a particular user and the particular position. The LLM can employ the inputs, the data from the Longformer model, the cosine similarity calculator, and the NER tagging system, and one or more prompt inputs to generate a capability ranking. The capability ranking can include but is not limited to a ranking of the users based on the disclosed systems' perceived correlation between the user and the particular position and a general description summarizing the capability data of each user. The capability ranking can include any particular metric generated by the disclosed system used to rank each user based on their correlation to the particular position.

These and other aspects, features, and benefits of the claimed innovation(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more examples and/or aspects of the disclosure and, together with the written description, serve to explain the principles of the disclosure. Wherever possible, the same reference numbers are used throughout the drawings to refer to the same or like elements of the present concept, and wherein.

DETAILED DESCRIPTION

Figure 1:
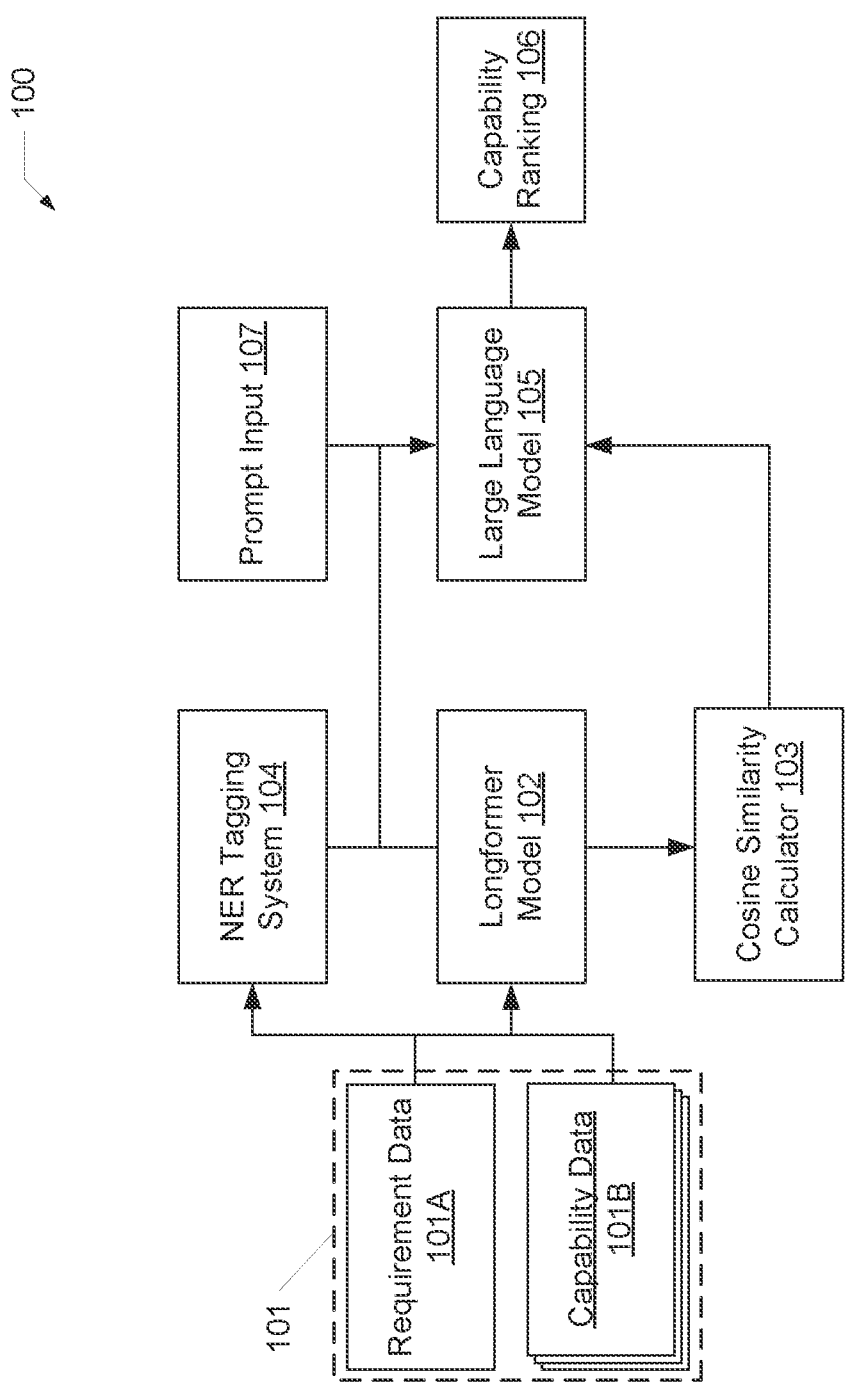
FIG. 1 illustrates a capability ranking workflow, according to one example of the disclosed technology.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the examples illustrated in the drawings and specific language will be used to describe the same. It will, nevertheless, be understood that no limitation of the scope of the disclosure is thereby intended; any alterations and further modifications of the described or illustrated examples, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for ranking one or more users for a particular position. The disclosed technology can include machine learning techniques for processing capability data associated with a user and requirements data associated with a particular position. The capability data can include any particular data that relates to the abilities and qualities of a particular user. The requirement data can include any particular data that relates to the desired attributes associated with a particular position. The machine learning techniques of the disclosed technology can measure the applicability of a user's capabilities for a particular position and determine if the user is a proper fit for the particular position.

The disclosed technology can include four main components: a Longformer model, a NER tagging system, a cosine similarity calculator, and a large language model (LLM). The Longformer model can include a neural network system used to receive one or more inputs (e.g., the capability data, the requirement data), tokenize the inputs, and generate contextual embeddings for each of the extracted tokens. The Longformer model can employ a local windowed attention mechanism and a global attention mechanism to minimize the computation strain necessary to generate contextual embeddings for each token extracted from the inputs. The tokens can define a segment of text (e.g., a word, phrase, series of characters) that functions as a portion of the overall input. The Longformer model can break down the inputs into tokens such that the Longformer model can generate contextual embeddings for each of the tokens. The Longformer model can average the contextual embeddings for each particular user such that the averaged vector represents a general quantification of the user's capabilities.

The NER tagging system can include a classification algorithm used to receive one or more inputs, classify each word in the inputs into position-relevant entities, and generate an entity matching score for the capability data. For example, the NER tagging system can classify words present in the inputs that fall under position-relevant entities. The NER tagging system can generate the entity matching score to quantify how closely related the capability data is to particular position-relevant entities.

The cosine similarity calculator can calculate a cosine similarity, where the cosine similarity measures the correlation between a particular user and the particular position. For example, the cosine similarity calculator can calculate the cosine similarity between the contextual embedding of a capability data associated with a user and the contextual embeddings calculated for the requirements data. The cosine similarity can be translated to the semantic alignment score, where the semantic alignment score measure on a scale of 0 to 100 how well suited a particular user is for a particular position.

The LLM and/or any other component of the disclosed system can employ the inputs, the data from the Longformer model, the cosine similarity calculator, and the NER tagging system, and one or more prompt inputs to generate a capability ranking. The capability ranking can include but is not limited to a ranking of the users based on the disclosed systems' perceived correlation between the user and the particular position and a general description summarizing the capability data of each user. The capability ranking can include any particular metric generated by the disclosed system used to rank each user based on their correlation to the particular position. For example, the capability ranking can include a text description generated by the LLM describing why each user is or is not qualified for the particular position. In another example, the capability ranking can include a simple ranking of each user based on their associated cosine similarity, their entity matching score, or a combination thereof (also referred to herein as an overall score). In yet another example, the disclosed system can generate the capability ranking by bypassing the LLM and generating a ranking of the users based on the overall score.

Example Embodiments

Referring now to the figures, for the purposes of example and explanation of the fundamental processes and components of the disclosed systems and processes, reference is made to FIG. 1, which illustrates an example capability ranking workflow 100. As will be understood and appreciated, the capability ranking workflow 100 shown in FIG. 1 represents merely one approach or example of the present concept, and other aspects are used according to various examples of the present concept.

The capability ranking workflow 100 can illustrate a computer-implemented technique for evaluating the capabilities of a user against various requirements for a particular position (also referred to as a particular asset). The capabilities of the user can be defined as one or more attributes associated with the user that quantify the overall quality of the user's abilities. For example, capabilities can include prior experiences, educational background, user interests, and/or any other attributes associated with the user. The requirements for the particular position can include one or more ideal attributes desired from a particular user to satisfy the particular position. The capability ranking workflow 100 can evaluate more than one user, each with distinct capabilities, against the various requirements of the particular position. As discussed in further detail herein, a networked environment 200 can implement the capability ranking workflow 100 (see FIG. 2 for further details).

The capability ranking workflow 100 can include receiving one or more inputs 101. The inputs 101 can include requirement data 101A and one or more capability data 101B. The requirement data 101A can include any information associated with the particular position. For example, the requirement data 101A can include mandatory requirements (e.g., minimum education level, years of experience, degree type, degree level), preferred requirements (e.g., strong interpersonal skills), and a position description. The requirement data 101A can include text, audio, and/or video, each of which can be in any particular data format. For example, the requirement data 101A can include text files, Word documents, PDF documents, Extensible Markup Language (XML) data, HyperText Markup Language (HTML) data, Microsoft Excel spreadsheet (XLS or XLSX) data, videos, audio recordings, and/or any other form of data capable of transmitting requirement data 101A associated with the particular position. The capability data 101B can include any particular data associated with a specific user. For example, the capability data 101B can include past experiences, educational background, user interests, associated documents (e.g., a thesis paper, scholarly journal entries, patent applications, code, case studies), videos, audio recordings, and/or any other data associated with the user. The capability data 101B can include written data, videos, audio recordings, code, and/or any other data types. For example, the capability data 101B can include text files, Word documents, PDF documents, Extensible Markup Language (XML) data, HyperText Markup Language (HTML) data, Microsoft Excel spreadsheet (XLS or XLSX) data, videos, audio recordings, and/or any other form of data associated with the user.

The capability ranking workflow 100 can include a Longformer model 102, a cosine similarity calculator 103, a Name Entity Recognition (NER) tagging system 104, and a Large Language Model (LLM) 105. The Longformer model 102 can define a neural network system capable of tokenizing, embedding, and synthesizing the semantic nature of the inputs 101. The NER tagging system 104 can define a classification algorithm capable of identifying and categorizing named entities from the inputs and classifying the named entities into predefined categories. The cosine similarity calculator 103 can define a calculating system for quantifying similarities between the capability data 101B and the requirement data 101A. The LLM system 105 can process the data generated from the cosine similarity calculator 103, the data generated from the NER tagging system 104, the inputs 101, and a prompt input 107 to generate a capability ranking 106. The capability ranking 106 can include a ranking of one or more users for a particular position based on a overall score (discussed in further detail herein) and a summary of each user and their associated capability data. The capability ranking 106 can rank the users in descending order, where higher ranked users can indicate they are better suited for the particular position than lower ranked users. The processes of each system of the capability ranking workflow 100 are discussed in further detail herein.

The Longformer model 102 can process the inputs 101. The Longformer model 102 can individually process the requirement data 101A and individually process each of the capability data 101B. For example, each of the processes performed by the Longformer model 102, the cosine similarity calculator 103, and the NER tagging system 104 can be performed first on the requirement data 101A and then again on each of the capability data 101B (though any order of processing can be performed). Independently processing the requirement data 101A from the capability data 101B can allow the networked environment 200 to evaluate the requirement data 101A against each of the capability data 101B.

The Longformer model 102 can possess various benefits over traditional machine learning systems capable of processing text. For example, traditional machine learning systems used to process text, such as recurrent neural networks (RNNs), long short-term memory (LSTM) systems, and gated recurrent neural networks, process text sequentially (e.g., one word after another). The sequential nature of these traditional machine learning systems can reduce their ability to identify key relationships between words separated by varying amounts of text. Transformer models, another traditional machine learning system, partially solve this issue by using attention mechanisms to generate variable weightings for words identified as more or less important in the context of the text. For example, the attention mechanism can generate a relatively large weighting for the subject of a sentence as it relates to other words used later in the sentence. By increasing the weight of important words, the transformer models can properly identify relationships between distant words. The downfall of the transformer models is their inability to scale linearly with increased text inputs. The Longformer model 102 can solve the inefficiency issue by employing a local windowed attention mechanism and a global attention mechanism. The local windowed attention mechanism of the Longformer model 102 can allow the Longformer model 102 to analyze words locally within a predefined window. The predefined window can define a finite number of adjacent tokens that the Longformer model 102 can use when analyzing a particular word. The global attention mechanism of the Longformer model 102 can identify one or more specific words, typically with high contextual importance (e.g., subjects, objects, verbs), and can give global attention to the specific words such that the Longformer model 102 can incorporate the specific words during the analysis of any particular word within the text, regardless of where the specific words fall relative to the predefined window. By employing the local windowed attention mechanism and the global attention mechanism, the Longformer model 102 can process larger sets of data while maintaining efficient and effective textual processing capabilities.

The Longformer model 102 can process the inputs 101 by generating one or more tokens from the inputs 101. A token can be defined as a subset of characters derived from the inputs 101. For example, if one of the capability data 101B includes text that states, "Explored the application of the K-SVD algorithm specifically for categorizing music based on its perceived genre," the Longformer model 102 can generate tokens for each word in the previously stated sentence (e.g., a token for the word "Explored" and a token for the word "music"). The Longformer model 102 can generate tokens for one or more subsets of characters (also referred to as subwords) extracted from the inputs 101. For example, though the Longformer model 102 can generate tokens for each word in a particular input 101, the Longformer model 102 can also generate tokens for each phrase in the particular input 101 and/or for subsets of characters in the particular input (e.g., generating tokens for punctuation, portions of words). Continuing this example, the Longformer model 102 can reference each subset of characters from the inputs 101 against a model vocabulary dataset. When the subset of characters matches a particular word or phrase stored in the model vocabulary dataset, the Longformer model 102 can identify the particular subset of characters as a word or phrase and store the word or phrase as an individual token. When the subset of characters does not match a particular word or phrase stored in the model vocabulary dataset, the Longformer model 102 can store the subset of characters as its own token. Though discussed in the context of the Longformer model 102, any particular tokenizer can be used to tokenize the inputs 101. For example, the networked environment 200 can employ the TensorFlow software library and any of its native tokenizers to generate one or more tokens from the inputs 101 and perform functionalities substantially similar to the Longformer model 102.

On generation of the tokens, the Longformer model 102 can generate one or more unique IDs for each token. The Longformer model 102 can assign each token a numerical value to function as their respective unique IDs. The Longformer model 102 can aggregate the unique IDs into a multi-dimensional array, referred to herein as a tensor. Similarly, the networked environment 200 can employ the TensorFlow software library and/or any other software system capable of generating tensors to generate one or more tensors from the unique IDs of each generated token.

The Longformer model 102 can generate one or more contextual embeddings for each token and/or tensor generated from the inputs 101. Embeddings can be defined as vector representations of each token and/or tensor within a vector space. For example, in a case where the token is a single word, the embedding of the single word can define in a vector space the word's context, frequency, and relationship with other words in a particular text. In some word embedding models such as Word2Vec or GloVe, each word can be assigned a fixed vector based on its usage in a training corpus. The fixed vector, known as a fixed representation, remains constant regardless of the word's context in different sentences. Though the fixed representation provides a general vectorized definition for the particular token, the fixed representation fails to capture different semantic meanings of the same word used in different contexts within the same text. The contextual embeddings generated by the Longformer model 102 can correct the shortcomings of the fixed representations by quantifying features associated with each word as they are used and reused in a particular text. For example, the Longformer model 102 can generate a first embedding for the word "present," as it's used in the sentence, "Mike gave Kat a topic to present." Continuing this example, the Longformer model 102 can generate a second embedding for the word "present," as it's used in the sentence, "Mike was present when Kat arrived." Rather than using a fixed vector for the same word "present," the Longformer model 102 can calculate two distinct embeddings for the word "present" as it's used in different sentences within the same text. By recalculating the embeddings for each word, regardless of its prior use, the Longformer model 102 can preserve the contextual nature of each word as it's used and reused within the particular text.

The Longformer model 102 can generate contextual embeddings for each tensor and/or token by calculating one or more multi-dimensional vectors for each tensor and/or token. For example, the Longformer model 102 can receive one or more tensors. The Longformer model 102 can pass each unique ID stored in the one or more tensors through its various neural network layers to generate a unique multi-dimensional vector for each token extracted from the inputs 101. Using the local windowed attention mechanism and the global attention mechanism, the Longformer model 102 can adjust the multi-dimensional vectors for each token by considering the context provided by surrounding tokens. By generating multi-dimensional vectors for each tensor and/or token, the networked environment 200 can map the multi-dimensional vectors in a multi-dimensional space. The networked environment 200 can determine the similarities between each tensor and/or token by analyzing the proximity of various multi-dimensional vectors within the multi-dimensional space. The closeness of two or more tensors and/or tokens within the multi-dimensional space can illustrate the semantic relationship between the two or more tensors and/or tokens.

The Longformer model 102 can calculate the mean of the contextual embeddings for each of the capability data 101B and again the requirement data 101A. For example, the Longformer model 102 can generate contextual embeddings from the capability data 101B of a first user. The contextual embeddings can include all multi-dimensional vectors generated from analyzing each token extracted from the capability data 101B of the first user. The Longformer model 102 can calculate the mean of the contextual embeddings by averaging all of the multi-dimensional vectors into a summary vector. The summary vector can represent the semantic information of the capability data 101B of the first user in a condensed form. The mean of the contextual embeddings can be calculated individually for each of the capability data 101B and the requirement data 101A.

The Longformer model 102 can send the contextual embeddings to the cosine similarity calculator 103. The contextual embeddings can include a first set of contextual embeddings associated with the capability data 101B and a second set of contextual embeddings associated with the requirement data 101A. On receiving the contextual embeddings, the cosine similarity calculator 103 can calculate a cosine similarity between the first set of contextual embeddings and the second set of contextual embeddings. The cosine similarity can quantify an overall relationship between the compatibility data 101B and the requirement data 101A. The cosine similarity calculator 103 can calculate an individual cosine similarity for each of the contextual embeddings of each of the capability data 101B as they are measured against the requirement data 101A. By calculating individual cosine similarities for each of the capability data 101B, each user can be evaluated against the requirement data 101A of the particular position.

The cosine similarity can include a value between −1 and 1. As the cosine similarity approaches 1, the cosine similarity can indicate a greater degree of similarity between the particular capability data 101B and the requirement data 101A (e.g., indicating that the user is a good fit for the particular position). For example, a cosine similarity of 1 can indicate that the particular capability data 101B is an exact match with the requirement data 101A. As the cosine similarity approaches −1, the cosine similarity can indicate a lesser degree of similarity between the particular capability data 101B and the requirement data 101A (e.g., indicating that the user is not a good fit for the particular position). For example, a cosine similarity of −1 can indicate that the particular capability data 101B is completely distinct from the requirement data 101A. In another example, a first user can include a first capability data 101B, and a second user can include a second capability data 101B. The Longformer model 102 can generate a first contextual embedding from the first capability data 101B and a second contextual embedding from the second capability data 101B. The Longformer model 102 can generate a third contextual embedding from the requirement data 101A. The cosine similarity calculator 103 can calculate a first cosine similarity of −0.243 as measured between the first contextual embedding against the third contextual embedding. The cosine similarity calculator 103 can calculate a second cosine similarity of 0.972 between the second contextual embedding and the third contextual embedding. The score of 0.972 associated with the second user can indicate that the first user is better suited for the particular position as compared to the first user.

The cosine similarity calculator 103 can employ the summary vectors of each capability data 101B and the requirement data 101A to calculate the cosine similarities for each user. For example, The Longformer model 102 can calculate a first summary vector for a first user and their associated capability data 101B. Continuing this example, the Longformer model 102 can calculate a second summary vector for a second user and their associated capability data 101B. Further continuing this example, the Longformer model 102 can calculate a third summary vector for a particular position and its associated requirement data 101A. The cosine similarity calculator 103 can calculate a first cosine similarity between the first summary vector and the third summary vector and a second cosine similarity between the second summary vector and the third mean vector. The first cosine similarity can quantify how qualified the first user is for the particular position, while the second cosine similarity can quantify how qualified the second user is for the particular position.

The cosine similarity calculator 103 can translate the cosine similarity into a semantic alignment score ranging from 0 to 100. In an example where the semantic alignment score is 100, the score can indicate that the capabilities of the particular user are substantially similar to the desired capabilities of the particular position. In another example where the semantic alignment score is 0, the score can indicate that the capabilities of the particular user are not similar to the desired capabilities of the particular position. On generation of the semantic alignment score, the cosine similarity calculator 103 can send the semantic alignment score to the LLM system for further processing.

The NER tagging system 104 can tag and/or classify the inputs 101 to generate an entity matching score. The NER tagging system 104 can include a classification algorithm and/or any other machine learning system capable of identifying named entities and classifying the named entities into predetermined categories. Named entities can include but are not limited to names of people, organizations, locations, expressions of times, quantities, monetary values, percentages, and/or any particular word, name, acronym, series of characters, and/or value that has a specialized meaning. For example, the NER tagging system 104 can be specifically trained to identify words that fall within one of the position-relevant entities, where the position-relevant entities are categories of terms commonly used in specific fields and commonly found in the requirement data 101A and/or the capability data 101B. The position-relevant entities can include but are not limited to "Programming," "Domain," "Hard Skill," "Degree," "Role," "Software," "Language," and "Data Science."

On identifying named entities that fall within a particular position-relevant entity, the NER tagging system 104 can classify the named entities into position-relevant subcategories. For example, the position-relevant subcategories for the position-relevant entity "Programing" can include but are not limited to descriptions (e.g., mentions of programming languages, related software tools, coding actions or practices, interfaces, processes, frameworks), definitions (e.g., references to specific programming languages, integrated development environments (IDEs), specific coding or software development methodologies, interfaces, platforms), examples (e.g., example patent application, example journal article), languages (e.g., Python, Javascript, Java, C++, R, Spanish, Italian), IDEs/Editors (e.g., VS Code, Jupyter, Jupyter Notebook, Spyder, RStudio), Interfaces/Frameworks (e.g., application programming interface (API), FastAPI, RESTful services, Web), Protocols (e.g., Bluetooth), Practices (e.g., object-oriented programming (OOP), Version Control), Processes/Methodologies (e.g., object-oriented analysis and design (OOAD), SCRUM, Agile, software development lifecycle (SDLC)), cloud computing platforms (e.g., Amazon Web Services (AWS), Amazon EC2, Amazon S3, AWS Lambda, Microsoft Azure, Google Cloud Platform, Kubernetes, Docker, Container, Virtual Machines, IBM Cloud), and/or any other category of position-relevant information. The position-relevant entities and position-relevant subcategories can vary over time, allowing for the NER tagging system 104 to classify named entities with the most up-to-date information.

On classifying the inputs 101, the NER tagging system 104 can generate the entity matching score. The entity matching score can quantify the amount of position-relevant entities within the particular input 101. The entity matching score, for example, can range from 0 to 100, where 100 can indicate that there is a high abundance of position-relevant entities within the particular input 101, and 0 can indicate that there is a low abundance of position-relevant entities within the particular input 101.

Though illustrated as processing data concurrently with the Longformer model 102, the NER tagging system 104 can function as a data pre-processing technique for narrowing the inputs based on one or more desired position-relevant entities. For example, the NER tagging system 104 can generate scores for capability data 101B that specifically include "PhD" as an entity. The NER tagging system 104 can send to the Longformer model 102 the one or more capability data 101B that surpass a threshold of 70% (or any particular value), indicating that the entity "PhD" is present in the capability data 101B.

The entity matching score and the semantic alignment score can be combined to generate an overall score. For example, the networked environment 200 can generate the overall score for each user and assign the overall score to their corresponding capability data 101B. The overall score can measure the overall quality of a user when compared to the particular position.

The LLM 105 can receive and process the inputs 101, the overall scores, and the prompt input 107 to generate the capability ranking 106. The LLM 105 can receive the inputs 101 as the basis for analyzing each of the users. The LLM 105 can process the overall scores associated with each of the capability data 101B to identify the quality of each user relative to the particular position. The LLM 105 can receive the prompt input 107, where the prompt input 107 can request the LLM 105 to generate a written description discussing why a particular user is or is not a good fit for the particular position based on their associated overall score and capability data 101B. Once requested by the prompt input 107, The LLM 105 can analyze the capability data 101B and the overall scores for each user and generate the capability ranking 106. The capability ranking 106 can include but is not limited to a ranking of each user based on their overall score, a textual description of the capability data 101B associated with each user, and why each user is or is not a good fit for the particular position. The capability ranking 106 can function as a final description of each user and identify the users that are best suited to satisfy the particular position.

Figure 2:
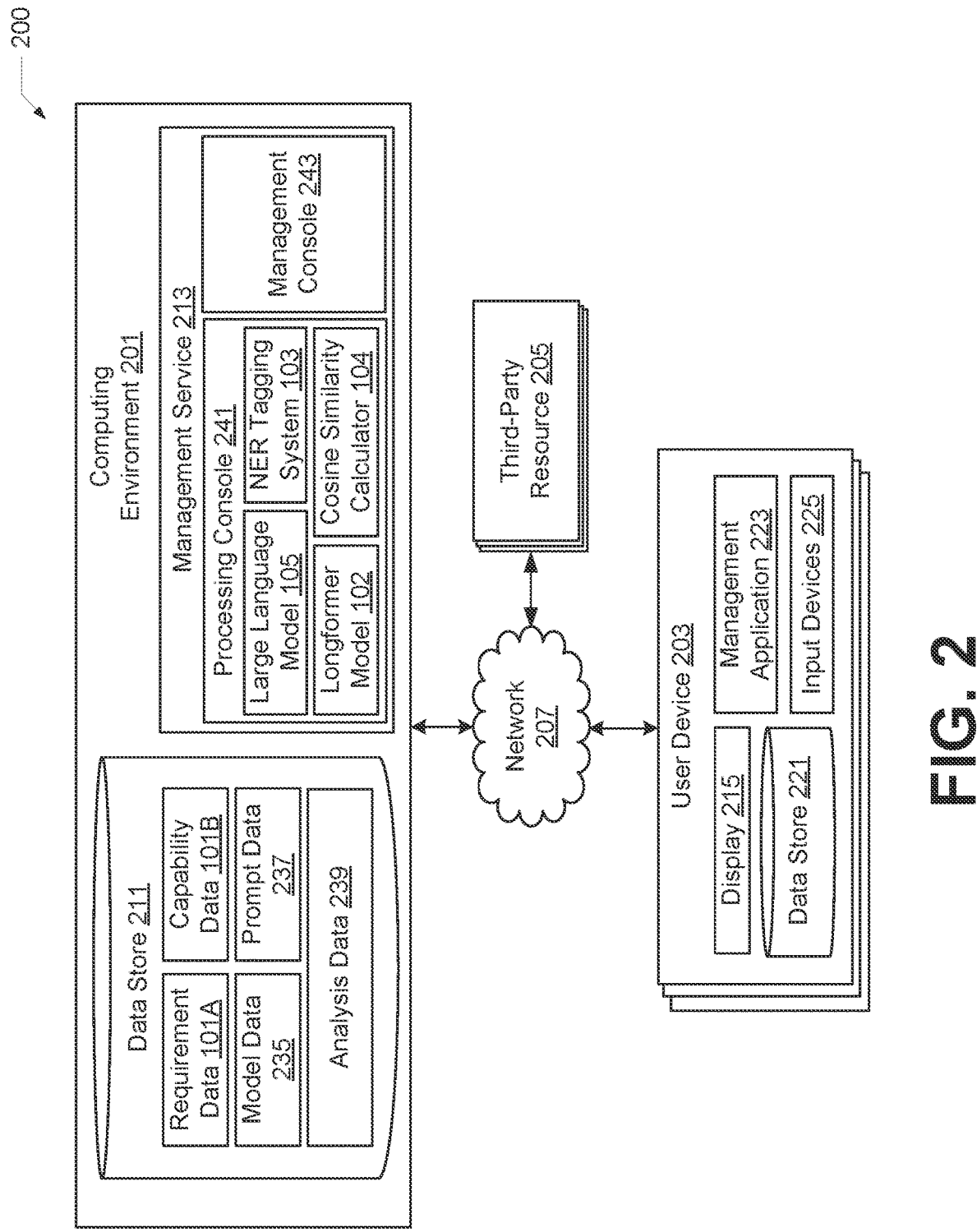
FIG. 2 illustrates a networked environment, according to one example of the disclosed technology.

Referring now to FIG. 2, illustrated is the networked environment 200, according to various examples of the present disclosure. The networked environment 200 can include a computing environment 201, a user device 203, and one or more third-party resources 205, which can be in data communication with each other via a network 207. The network 207 can include, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

The networked environment 200 can function as the general computing infrastructure used to implement the capability ranking workflow 100. For example, the computing environment 201 can include many of the systems, models, and/or components used to process and generate data described in the capability ranking workflow 100.

The computing environment 201 can include, for example, a server computer or any other system providing computing capability. Alternatively, the computing environment 201 can employ more than one computing device that can be arranged, for example, in one or more server banks or computer banks or other arrangements. Such computing devices can be located in a single installation or can be distributed among many different geographical locations. For example, the computing environment 201 can include one or more computing devices that together can include a hosted computing resource, a grid computing resource, and/or any other distributed computing arrangement. In some cases, the computing environment 201 can correspond to an elastic computing resource where the allotted capacity of processing, network, storage, or other computing-related resources can vary over time.

The data stored in the data store 211 can includes, for example, list of data, and potentially other data. The data store 211 can function as the central data storage system of the computing environment 201. The data store 211 can be local to the computing environment 201 and/or can be detached from the computing environment 201 in a server and/or cloud configuration. The data store 211 can include but is not limited to the requirement data 101A, the capability data 101B, a model data 235, a prompt data 237, and an analysis data 239.

The requirement data 101A can include any data associated with a particular position. For example, the requirement data 101A can include mandatory requirements (e.g., minimum education level, years of experience, degree type, degree level), preferred requirements (e.g., strong interpersonal skills), and a position description. The requirement data 101A can include text, audio, and/or video, each of which can be in any particular data format. For example, the requirement data 101A can include text files, Word documents, PDF documents, Extensible Markup Language (XML) data, HyperText Markup Language (HTML) data, Microsoft Excel spreadsheet (XLS or XLSX) data, videos, audio recordings, and/or any other form of data capable of transmitting requirement data 101A associated with the particular position.

The capability data 101B can include any particular data associated with a specific user. For example, the capability data 101B can include past experiences, educational background, user interests, associated documents (e.g., a thesis paper, scholarly journal entries, patent applications, code, case studies), videos, audio recordings, and/or any other data associated with the user. The capability data 101B can include written data, videos, audio recordings, code, and/or any other data types. For example, the capability data 101B can include text files, Word documents, PDF documents, Extensible Markup Language (XML) data, HyperText Markup Language (HTML) data, Microsoft Excel spreadsheet (XLS or XLSX) data, videos, audio recordings, and/or any other form of data associated with the user. The capability data 101B can include various instances, each including different data and associated with a unique user device 203. For example, a first capability data 101B can be associated with a first user device 203, and a second capability data 101B can be associated with a second user device. Each of the capability data 101B can define various attributes associated with the particular user of the associated user device 203. In another example, the capability data 101B is associated with a specific user referenced from the third-party resource 205. The capability data 101B can include a username, user email, user cellphone number, a user address, a user contact information, and/or any other data associated with the particular user.

The model data 235 can include any information used to process, train, and implement machine learning models/algorithms, artificially intelligent systems, deep learning models (e.g., neural networks), large language models, and/or natural language processing systems. Non-limiting examples of models stored in the model data 235 can include topic modelers, neural networks, linear regression, logistic regression, ordinary least squares regression, stepwise regression, multivariate adaptive regression splines, ridge regression, least-angle regression, locally estimated scatterplot smoothing, decision trees, random forest classification, support vector machines, Bayesian algorithms, hierarchical clustering, k-nearest neighbors, K-means, expectation maximization, association rule learning algorithms, learning vector quantization, self-organizing map, locally weighted learning, least absolute shrinkage and selection operator, elastic net, feature selection, computer vision, dimensionality reduction algorithms, gradient boosting algorithms, and combinations thereof. Neural networks can include but are not limited to uni- or multilayer perceptron, convolutional neural networks, recurrent neural networks, long short-term memory networks, auto-encoders, deep Boltzmann machines, deep belief networks, back-propagations, stochastic gradient descents, Hopfield networks, and radial basis function networks. The model data 235 can include a plurality of models stored in the model data 235 of varying or similar composition or function.

The models stored in the model data 235 can include various properties that can be adjusted and optimized by the corresponding engine during model training. The properties can include any parameter, hyperparameter, configuration, or setting of the model stored in the model data 235. Non-limiting examples of properties include coefficients or weights of linear and logistic regression models, weights and biases of neural network-type models, cluster centroids in clustering-type models, train-test split ratio, learning rate (e.g. gradient descent), choice of optimization algorithm (e.g., gradient descent, gradient boosting, stochastic gradient descent, Adam optimizer, XGBoost, etc.), choice of activation function in a neural network layer (e.g. Sigmoid, ReLU, Tanh, etc.), choice of value or loss function, number of hidden layers in a neural network, number of activation units (e.g., artificial neurons) in each layer of a neural network, drop-out rate in a neural network (e.g., dropout probability), number of iterations (epochs) in training a neural network, number of clusters in a clustering task, Kernel or filter size in convolutional layers, pooling size, and batch size.

The model data 235 can include models, data, and/or any other information employed by the Longformer model 102, the NER tagging system 104, and/or the LLM 105. For example, the Longformer model 102 can be stored in the model data 235 and executed using the processing console 241. In another example, the NER tagging system 104 can include one or more classification algorithms stored in the model data 235. In yet another example, one or more of the LLMs 105 can be stored in the model data 235 and executed by the processing console 241. The model data 235 can include the model vocabulary datasets and one or more software libraries used to implement the Longformer model 102, the NER tagging system 104, and/or the LLM 105 (e.g., TensorFlow libraries, PyTorch libraries).

The prompt data 237 can include the prompt inputs 107 received by the LLM 105. The prompt data 237 can include, for example, a request to generate the capability ranking 106, a request to reassess the capabilities of a specific user, a request to recommend the best user based on specific criteria, and/or any other information used to prompt the LLM 105 to generate a response. The prompt data 237 can include one or more templates used to automatically prompt the LLM 105 to generate specific and/or tailored responses for a particular task.

The analysis data 239 can include any particular data generated by the computing environment 201 and/or any other system distributed across the network 207. For example, the analysis data 239 can include one or more tokens extracted from the inputs 101, one or more unique IDs associated with each of the inputs, one or more tensors generated from the unique IDs, one or more contextual embeddings associated with each token, one or more summary vectors, one or more cosine similarities, one or more semantic alignment scores, one or more position-relevant entities, one or more analyzed inputs, and/or one or more capability rankings 106.

Various applications and/or other functionality can be executed in the computing environment 201 according to various examples. Also, various data can be stored in a data store 211 that can be accessible to the computing environment 201. The data store 211 can be representative of one or more of data stores 211 as can be appreciated. The data stored in the data store 211, for example, can be associated with the operation of the various applications and/or functional entities described below.

The components executed on the computing environment 201, for example, can include a list of applications, and other applications, services, processes, systems, engines, or functionalities discussed in detail herein. The computing environment 201 can include a processing console 241 and a management console 243.

The processing console 241 can function as the central computing source of the computing environment 201 and/or any other system distributed across the network 207. The processing console 241 can include a central processing unit capable of performing various calculations for the computing environment 201. The processing console 241 can include the Longformer model 102, the NER tagging system 104, the cosine similarity calculator 103, and the LLM 105.

The Longformer model 102 can include a neural network system and/or any other machine learning model capable of generating one or more embeddings from the inputs 101. The Longformer model 102 can perform calculations such as but not limited to tokenizing the inputs 101, generating unique IDs for each of the tokens, forming one or more tensors from the unique IDs, generating one or more contextual embeddings for each token, and calculating a summary vector from the one or more contextual embeddings. The Longformer model 102 can include various attention mechanisms for increasing its efficiency and processing capabilities for long textual inputs. For example, the Longformer model 102 can include the local windowed attention mechanism and the global attention mechanism. Continuing this example, the local windowed attention mechanism can allow the Longformer model 102 to focus on a finite number of adjacent tokens (referred to as the predefined window) when analyzing a particular token. Further continuing this example, the global attention mechanism can allow the Longformer model 102 to incorporate specific tokens outside of the predefined window when analyzing the particular token.

The NER tagging system 104 can include a classification algorithm and/or any other machine learning model capable of classifying the inputs 101 into position-relevant entities. The NER tagging system 104 can process the inputs 101 to classify one or more named entities as one or more position-relevant entities. Though discussed in the context of a classification algorithm, any particular machine learning system can perform the functionalities of the NER tagging system 104. For example, the LLM 105 can classify words extracted from the inputs 101 into specific position-relevant entities. The NER tagging system 104 can store in the data store 211 one or more words with associated position-relevant entities and position-relevant subcategories.

The cosine similarity calculator 103 can include any particular program capable of calculating the cosine similarity between the embeddings generated from a particular capability data 101B against the requirement data 101A. The cosine similarity calculator 103 can calculate the cosine similarity for each capability data 101B and store each of the cosine similarities in the analysis data 239.

The LLM 105 can include any particular large language model capable of generating the capability rankings 106. The LLM 105 can include but is not limited to various third-party LLMs, APIs for interfacing with one or more third-party LLMs, and/or custom-programmed LLMs. For example, the LLM 105S can include GPT 3.0, GPT 3.5, GPT 4.0, BERT, Lamda, and/or any other LLM system.

The management console 243 can process and distribute data received and/or generated from the computing environment 201 and/or any other resources distributed across the network 207. For example, the management console 243 can store data in the data store 211 received from the third-party resources 205 and/or the user devices 203. The management console 243 can distribute data within the computing environment 201. For example, the management console 243 can distribute between the data store 211 and the processing console 241.

The management console 243 can include a retrieval-augmented generation (RAG) system. The RAG system can aggregate real-time data associated with particular users and particular positions and update the corpus of information used by the LLM 105 to generate responses. For example, the RAG system can extract new position information from the third-party resources 205 and include the new position information in the prompt input 107, along with all other prompt information. Continuing this example, the LLM 105 can identify the new position information and use the new position information to generate responses that more accurately reflect real-time information. The management console 243 can employ the RAG system to extract real-time data continuously, on a timed schedule, and/or at any particular time interval. The RAG system can continuously provide the LLM 105 with real-time information such that the LLM has an up-to-date corpus for generating responses.

The user device 203 can be representative of a one or more user devices that can be coupled to the network 207. The user device 203 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The user devices 203 can include a display 215. The display 215 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The user devices 203 can be configured to execute various applications such as a management application 223 and/or other applications. The management application 223 can be executed in the user device 203, for example, to access network content served up by the computing environment 201 and/or other servers, thereby rendering a user interface on the display 215 To this end, the management application 223 can include, for example, a browser, a dedicated application, etc., and the user interface can include a network page, an application screen, etc. The user devices 203 can execute applications beyond the management application 223 such as, for example, email applications, social networking applications, word processors, spreadsheets, and/or other applications.

The user device 203 can function as an interface between the user and the computing environment 201. The user can be an individual looking to find a new position or an entity processing various capability data 101B for one of their own particular positions. The user device 203 can receive through one or more input devices 225 capability data 101B associated with the user. For example, the capability data 101B can include one or more resumes, supporting documents, cover letters, letters of recommendation, and/or any other information that describes the capabilities of the user. The user device 203 can send the capability data 101B to the computing environment 201 for further processing.

The user device 203 can receive data from the computing environment 201. For example, in the case where the user is an entity evaluating various capability scores for their own particular position, the user device 203 can receive from the computing environment 201 the capability ranking 106. The capability ranking 106 can render on the display 215 and inform the entity of the best user from the capability data 101B that satisfy the particular position.

The data store 221 of the user device 203 can function substantially similar to the data store 211. For example, the data store 221 can function as a mirrored data store of the data store 211. In another example, the data store 221 can include data locally that is not shared across the network 207 while receiving and distributing other data across the network 207.

The third-party resources 205 can include any particular data resource capable of distributing data across the network 207. The third-party resources 205 can include public data sources, private data sources, recruitment entity data sources, position-relevant data sources, and/or any other data source used to aggregate data for the computing environment 201 and/or the user device 203. For example, the third-party resources 205 can include a data repository managed by a recruitment entity, where the data repository can include one or more capability data 101B associated with one or more users.

Figure 3:
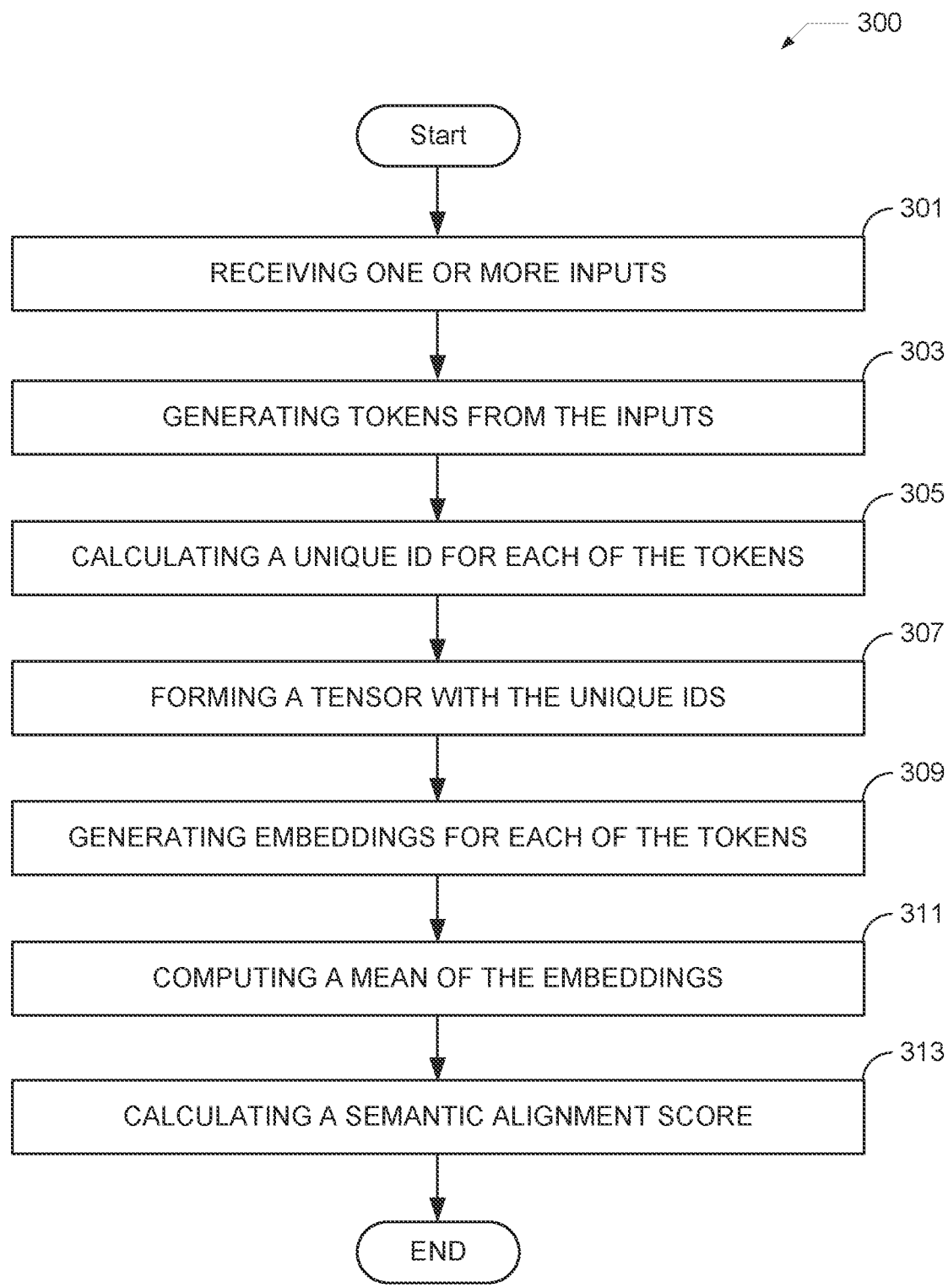
FIG. 3 illustrates a flowchart of a process for calculating a semantic alignment score, according to one example of the disclosed technology.

Referring now to FIG. 3, illustrated is a flowchart of a process 300, according to one example of the disclosed technology. The process 300 can illustrate a technique for generating one or more semantic alignment scores. The process 300 can be implemented by any particular system distributed across the network 207.

At box 301, the process 300 can include receiving one or more inputs 101. The computing environment 201 can receive one or more inputs 101. For example, the management console 243 can interface with the user devices 203 to receive one or more capability data 101B. The management console 243 can store each of the capability data 101B in the data store 211 and link each of the capability data 101B with its associated user device 203. The management console 243 can receive the requirement data 101A from the third-party resources 205. For example, the management console 243 can perform data scrapping to extract one or more requirement data 101A from various public third-party resources 205. In another example, the user device 203 of a particular entity can send the computing environment a requirement data 101A along with one or more capability data 101B corresponding with potential candidates for the particular position. In yet another example, the computing environment 201 can render on the display 215 a capability data 101B submission page.

At box 303, the process 300 can include generating tokens from the inputs 101. The processing console 241 can generate one or more tokens from the inputs 101. For example, the Longformer model 102 can generate one or more tokens from the one or more capability data 101B. Continuing this example, the Longformer model 102 can generate one or more tokens from the requirement data 101A. The Longformer model 102 can generate tokens that correspond with each word from the inputs 101, each phrase from the inputs 101, each subset of characters from the inputs 101, or a combination thereof. The Longformer model 102 can categorize a subset of characters as a token in a case where the subset of characters is not an identifiable word or phrase stored in the model vocabulary dataset. In another example, the processing console 241 can employ any particular tokenizer from the software libraries PyTorch and/or TensorFlow to generate the tokens from the inputs 101.

At box 305, the process 300 can include generating the unique ID for each of the tokens generated by the Longformer model 102. The processing console 241 can generate the unique ID for each of the tokens generated by the Longformer model 102. For example, the Longformer model 102 can generate the unique ID for each of the tokens. The unique IDs can define a numerical representation for each particular token.

At box 307, the process 300 can include forming a tensor with the unique IDs. The processing console 241 can form a tensor with the unique IDs. The tensor can include each unique ID associated with each token extracted from the inputs 101. By forming a tensor, all of the tokens can be passed through the Longformer model 102 for further processing.

At box 309, the process 300 can include generating contextual embeddings for each of the tokens. The processing console 241 can generate contextual embeddings for each of the tokens. For example, the Longformer model 102 can receive the tensors. The Longformer model 102 can process the tensors to generate a contextual embedding for each of the tokens stored in the tensors. The contextual embeddings can include multi-dimensional vectors used to map the tokens within a multi-dimensional space. The contextual embeddings can quantify the semantic nature of the particular token it's associated with.

At box 311, the process 300 can include computing the mean of the contextual embeddings generated from the tensors. The processing console 241 can compute a mean of the contextual embeddings generated from the tensors. For example, for a first set of contextual embeddings generated from a tensor associated with a first capability data 101B, the Longformer model 102 can generate a first summary vector from the first set of contextual embeddings. Continuing this example, the first summary vector can quantify an overall metric of a particular user's capabilities based on their associated capability data 101B. Further continuing this example, the processing console 241 can calculate a second summary vector based on the tensors associated with the requirement data 101A.

At box 313, the process 300 can include calculating a semantic alignment score. The processing console 241 can calculate a semantic alignment score. For example, the cosine similarity calculator 103 can calculate the cosine similarity between the first summary vector and the second summary vector. The cosine similarity can range from −1 to 1, where 1 can indicate that there is an exact match between the capabilities of the analyzed user and the requirements for the particular position, and −1 can indicate that there is no match between the capabilities of the analyzed user and the requirements for the particular position. The processing console 241 can translate the cosine similarity to the semantic alignment score, where the semantic alignment score ranges from 0 to 100. The processing console 241 can calculate the semantic alignment score for each capability data 101B against the requirement data 101A.

Figure 4:
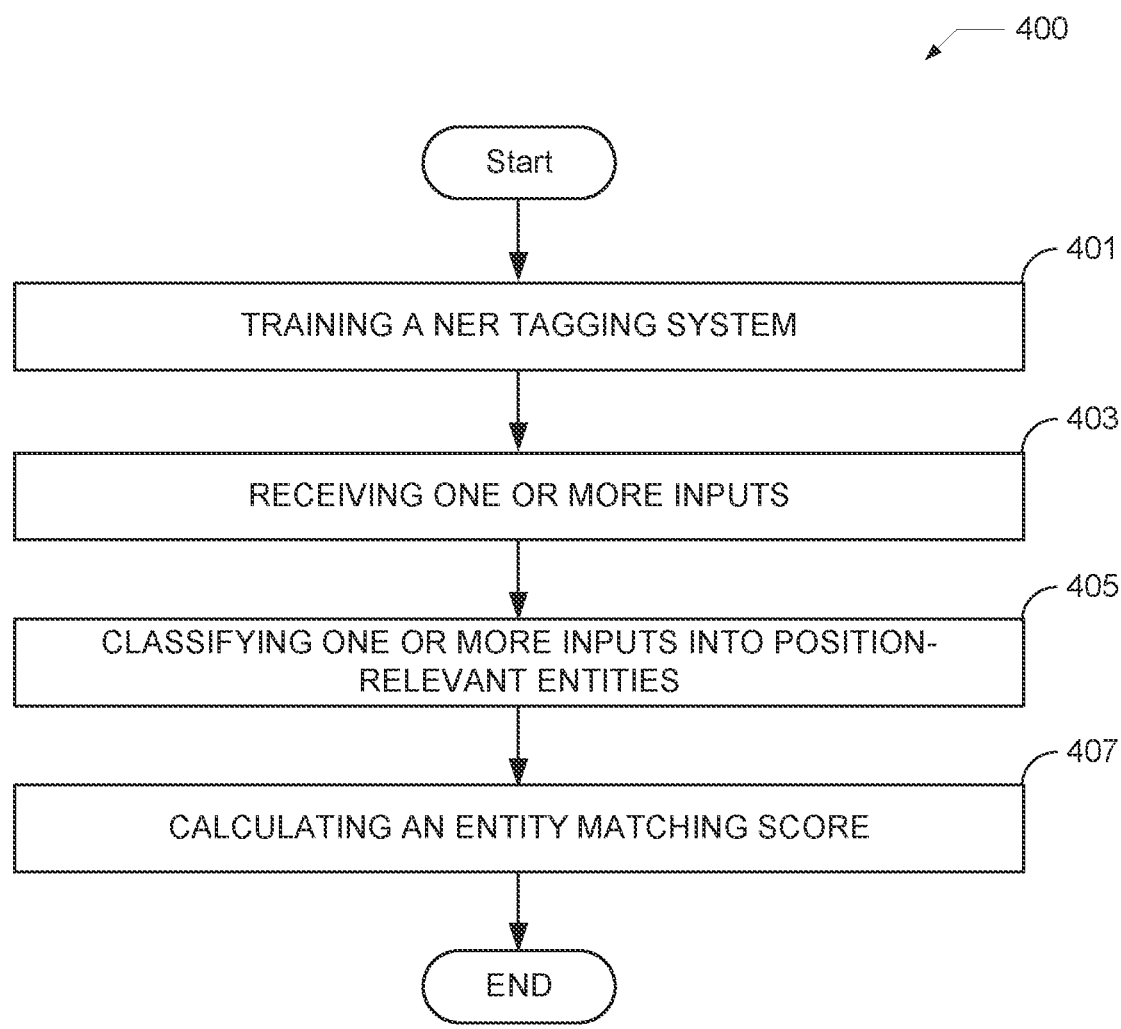
FIG. 4 illustrates a flowchart of a process for calculating an entity matching score, according to one example of the disclosed technology.

Referring now to FIG. 4, illustrated is a flowchart of a process 400, according to one example of the disclosed technology. The process 400 can demonstrate a technique for calculating an entity matching score. The process 400 can be implemented by the computing environment 201 and/or any other system distributed across the network 207.

At box 401, the process 400 can include training the NER tagging system 104. The processing console 241 can train the NER tagging system 104 such that the NER tagging system 104 can identify position-relevant entities. For example, the NER tagging system 104 can be trained to identify terms associated with "programming" (e.g., Java, C++, MATLAB). The processing console 241 can update the NER tagging system 104 to focus on specific topics. For example, the NER tagging system 104 can be retrained to identify position-relevant entities specifically for "PhD" candidates.

At box 403, the process 400 can include receiving one or more inputs 101. The NER tagging system 104 can receive the inputs 101. For example, the NER tagging system 104 can receive the inputs 101 from the data store 211, the user devices 203, and/or from the third-party resources 205.

At box 405, the process 400 can include classifying one or more inputs into position-relevant entities. The NER tagging system 104 can classify one or more words from the inputs 101 into position-relevant entities. For example, the NER tagging system 104 can include a classification algorithm. Continuing this example, the classification algorithm of the NER tagging system 104 can process the capability data 101B and identify words that fall into one of the position-relevant entities and/or the position-relevant subcategories.

At box 407, the process 400 can include calculating an entity matching score. The processing console 241 can calculate an entity matching score. On identifying and classifying words that fall into one of the position-relevant entities and/or the position-relevant subcategories, the processing console 241 can quantify the number of words that satisfy a particular position-relevant entity. For example, the entity matching score can range from 0 to 100, where 100 can indicate that the particular capability data 101B has a high volume of position-relevant entities, and where 0 can indicate that the particular capability data 101B has a low volume of position-relevant entities.

Figure 5:
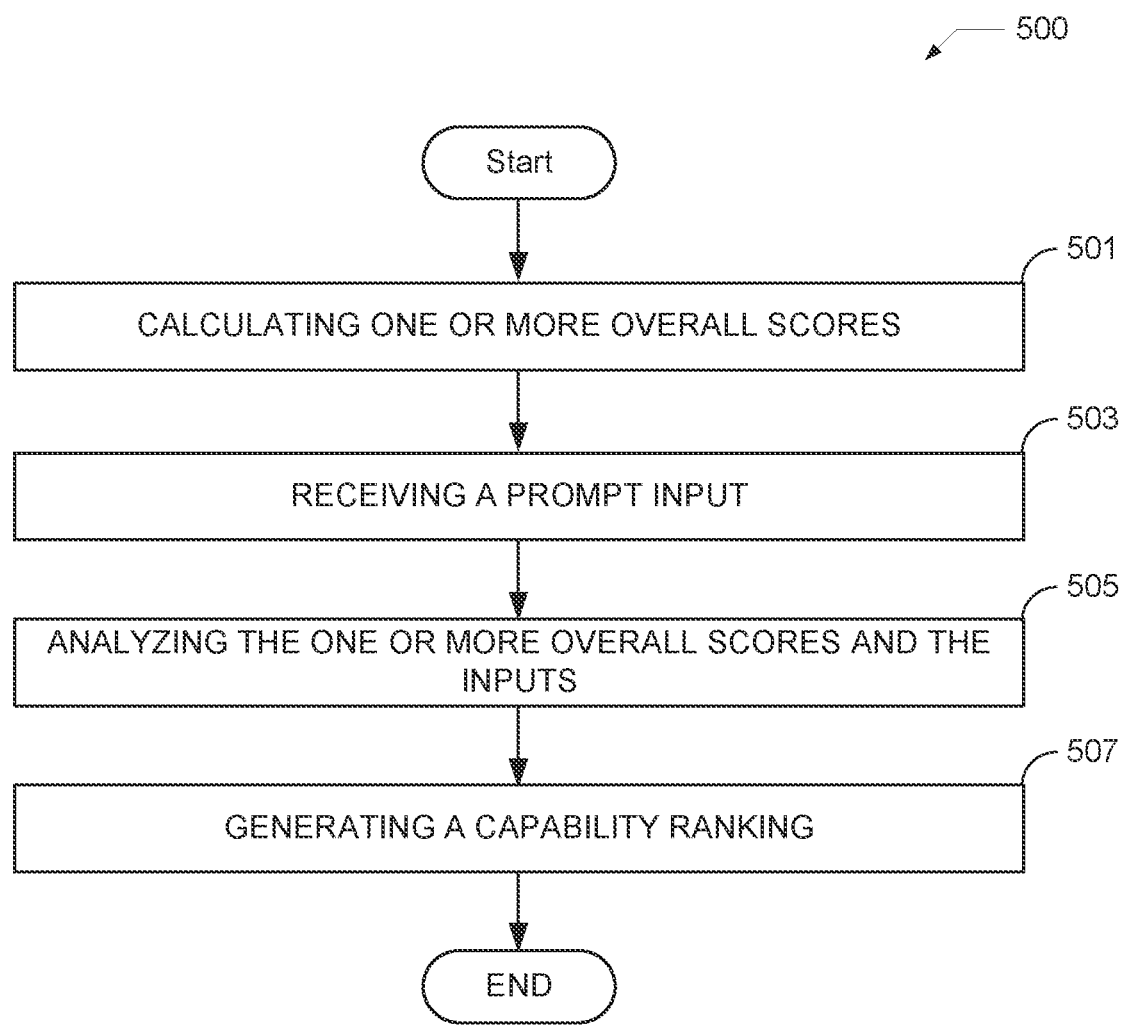
FIG. 5 illustrates a flowchart of a process for generating a capability ranking, according to one example of the disclosed technology.

Referring now to FIG. 5, illustrated is a flowchart of a process 500, according to one example of the disclosed technology. The process 500 can demonstrate a technique for generating a capability ranking 106. The process 500 can be implemented by the computing environment 201 and/or any other particular system distributed across the network 207.

At box 501, the process 500 can include calculating one or more overall scores. The processing console 241 can calculate the one or more overall scores. The overall score can quantify a combination of the semantic alignment score and the entity matching score. The overall score can define an overall score for the quality of a user's capabilities relative to the particular position of interest. The processing console 241 can calculate the overall score by measuring the weighted average between the semantic alignment score and the entity matching score. In another example, the processing consoler 241 can sum the semantic alignment score and the entity matching score to generate the overall score. The processing console 241 can perform any mathematical process to generate the overall score.

At box 503, the process 500 can include receiving a prompt input 107. The computing environment 201 can receive a prompt input 107. The prompt input 107 can include a first component received from the user device 203. The first component of the prompt input 107 can include a request for generating the capability ranking 106 based on the overall score and the capability data 101B. The prompt input 107 can include a second component received from the data store 211. The second component of the prompt input 107 can include the overall scores and their corresponding capability data 101B. The prompt input 107 can include a third component received from the RAG system. The third component can include any particular real-time data that will bring the LLM 105 up to date with current position-related information.

At box 505, the process 500 can include analyzing the one or more overall scores and the inputs 101. The LLM 105 can analyze the overall scores, the inputs 101, the prompt, and the real-time data to generate the capability ranking 106. The LLM 105, for example, can employ GPT 4.0 to analyze the overall scores, the inputs 101, the prompt, and the real-time data to generate the capability ranking 106.

At box 507, the process 500 can include generating the capability ranking 106. The LLM 105 can generate the capability ranking 106. The capability ranking 106 can include a ranking of the users based on their overall scores and a description stating why a user is or is not an adequate candidate for the particular position. The management console 243 can distribute the capability ranking 106 to one or more of the user devices 203, one or more of the third-party resources 205, and/or any other system distributed across the network 207.

Figure 6:
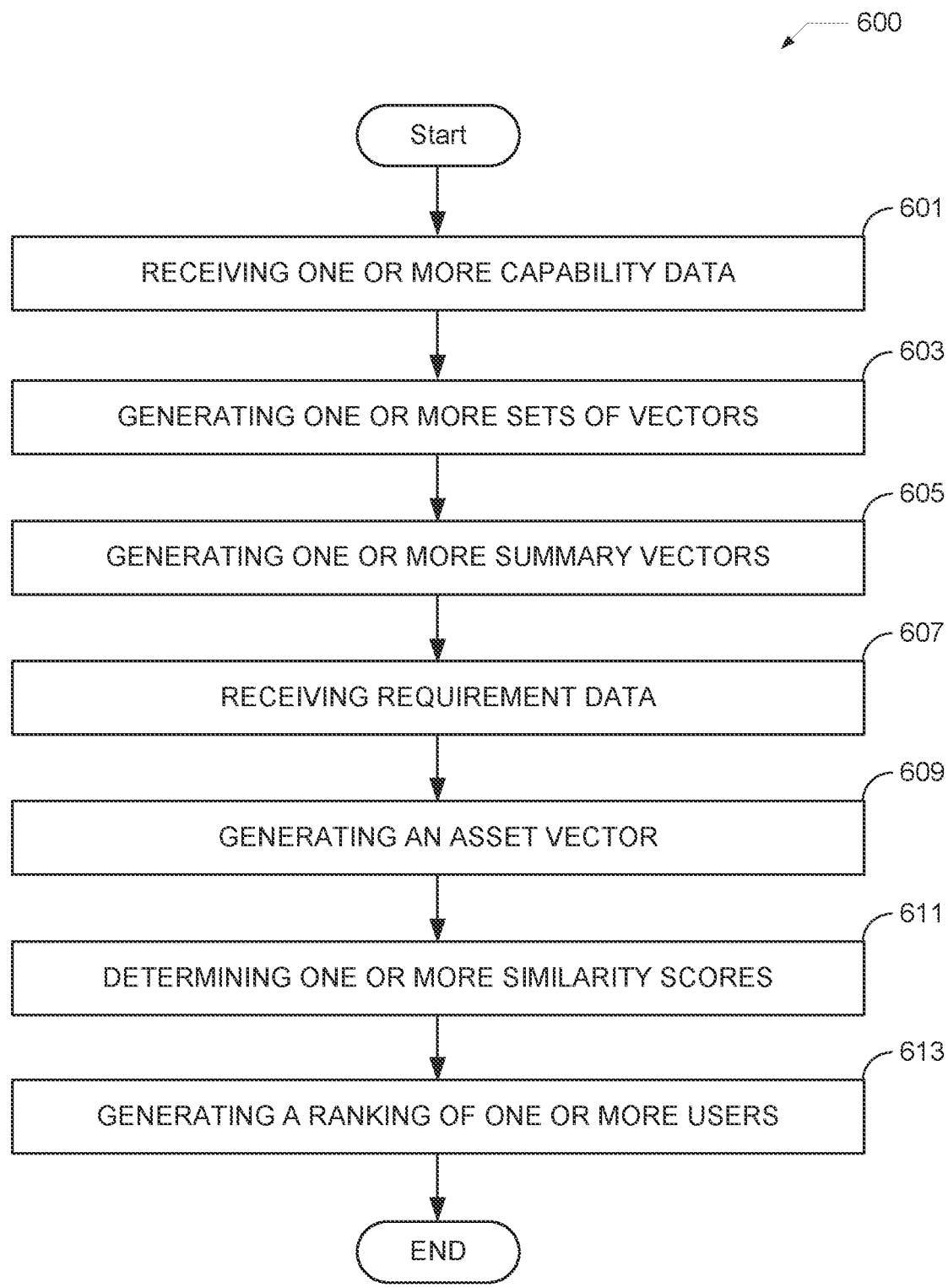
FIG. 6 illustrates a flowchart of a process for ranking the one or more users, according to one example of the disclosed technology.

Referring now to FIG. 6, illustrated is a flowchart of a process 600, according to one example of the disclosed technology. The process 600 can demonstrate a technique for generating a ranking of one or more users. The process 600 can be implemented by the computing environment 201 and/or any other system distributed across the network 207.

At box 601, the process 600 can include receiving one or more capability data 101B. The computing environment 201 can receive one or more capability data 101B from the user devices 203 and/or the third-party resources 205. For example, each user device 203 associated with a particular user can send the capability data 101B to the computing environment 201. The capability data 101B can each correspond with one particular user and user device 203. In another example, the user device 203 can belong to an entity, where the user device 203 can send various capability data 101B from various users aggregated by the particular entity. In yet another example, the management console 243 can aggregate capability data 101B distributed across the third-party resources.

At box 603, the process 600 can include generating one or more sets of vectors (e.g, contextual embeddings). The processing console 241 can apply the Longformer model 102 to the sets of capability data 101B to generate the sets of vectors individually representing a respective one of the sets of capability data 101B. The Longformer model 102 can tokenize the capability data 101B. On generating sets of tokens from each of the capability data 101B associated with each user, the Longformer model 102 can generate unique IDs for each token and store the unique IDs in one or more tensors. Each of the tensors can be associated with a particular capability data 101B and user. The Longformer model 102 can process the tensors to generate a set of vectors for each capability data 101B and user. The set of vectors can represent multi-dimensional contextual embeddings for each token, where the vectors can quantify the semantic nature of the particular tokens.

At box 605, the process 600 can include generating one or more summary vectors. The processing console 241 can generate one or more summary vectors individually corresponding to a particular set of the sets of capability data 101B. The processing console 241 can generate the summary vectors by calculating the mean of the set of vectors. The processing console 241 can calculate the summary vector for each particular capability data 101B and the corresponding user. By calculating the summary vector for each particular capability data 101B and the corresponding user, each user can have a unique summary vector that quantifies their respective capabilities.

At box 607 the process 600 can include receiving requirement data 101A. the computing environment 201 can receive requirement data 101A associated with a particular asset. The particular asset can define the particular position attempting to be filled. In one example, the user device 203 associated with a particular entity can send the requirement data 101A for a particular asset to the computing environment 201. In another example, the management console 243 can receive the requirement data 101A from the third-party resources (e.g., a recruitment database). In yet another example, the management console 243 can periodically data scrape the third-party resources to find new requirement data 101A.

At box 609, the process 600 can include generating an asset vector. The processing console 241 can generate an asset vector for the particular asset based on the requirement data 101A. The processing console 241 can employ substantially similar techniques discussed in boxes 604 and 605 to generate the asset vectors. For example, the Longformer model 102 can generate contextual embeddings for each of the tokens extracted from the requirement data 101A. Continuing this example, the Longformer model 102 can calculate the asset vectors by calculating the mean of the contextual embeddings associated with the requirement data 101A.

At box 611, the process 600 can include determining one or more similarity scores (e.g., semantic alignment scores). The processing consoler 241 can determine the similarity scores individually based on a comparison of a corresponding summary vector of the one or more summary vectors to the asset vector. The cosine similarity calculator 103 can calculate the similarity score for each of the summary vectors associated with each user. For example, the cosine similarity calculator 103 can calculate a cosine similarity between the asset vector of the requirement data 101A against the summary vector associated with the particular user. The processing console 241 can translate the cosine similarity, measured from −1 to 1, to the similarity score, measured from 0 to 100. The cosine similarity calculator 103 can calculate the similarity scores for each of the users.

At box 613, the process 600 can include generating a ranking of one or more users. The processing console 241 can generate a ranking of the one or more users for the particular asset based on the similarity scores. The processing console 241 can generate the capability ranking 106, where the capability ranking 106 includes a list of users ranked based on their respective similarity scores. For example, the users with the highest similarity scores can rank highest in the capability ranking 106. By ranking as the highest user, the processing console 241 predicts that the particular user has the most applicable capabilities for fulfilling a particular asset.

From the foregoing, it will be understood that various aspects of the processes described herein are software processes that execute on computer systems that form parts of the system. Accordingly, it will be understood that various examples of the system described herein are generally implemented as specially configured computers, including various computer hardware components and, in many cases, significant additional features as compared to conventional or known computers, processes, or the like, as discussed in greater detail herein. Examples within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the examples of the claimed innovations may be described in the context of computer-executable instructions, such as program modules or engines, as described earlier, being executed by computers in networked environments. Such program modules are often reflected and illustrated by flow charts, sequence diagrams, example screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Examples of the claimed innovation are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown as examples and other mechanisms of establishing communications over wide area networks or the Internet may be used.

While various aspects have been described in the context of a preferred example, additional aspects, features, and methodologies of the claimed innovations will be readily discernible from the description herein, by those of ordinary skill in the art. Many examples and adaptations of the disclosure and claimed innovations other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

Clause 1. A system, comprising: a memory device; and at least one hardware processor coupled to the memory device, wherein the at least one hardware processor is configured to: receive a plurality of sets of capability data individually describing one of a plurality of users; apply an artificial intelligence model to the plurality of sets of capability data to generate a plurality of sets of vectors individually representing a respective one of the plurality of sets of capability data; generating a plurality of summary vectors individually corresponding to a particular set of the plurality of sets of capability data; receive requirement data associated with a particular asset; generate an asset vector for the particular asset based on the requirement data; determine a plurality of similarity scores individually based on a comparison of a corresponding summary vector of the plurality of summary vectors to the asset vector; and generate a ranking of the plurality of users for the particular asset based on the plurality of similarity scores.

Clause 2. The system of clause 1 or any other clause herein, wherein the plurality of similarity scores comprise a plurality of cosine similarity scores.

Clause 3. The system of clause 1 or any other clause herein, wherein the at least one hardware processor is further configured to apply the artificial intelligence model by: generating a plurality of sets of tokenized capability data by applying a tokenizer algorithm to the plurality of sets of capability data; and generating a respective plurality of token vectors for each set of the plurality of sets of tokenized capability data.

Clause 4. The system of clause 3 or any other clause herein, wherein each summary vector of the plurality of summary vectors correspond to an average of the plurality of token vectors for a respective set of the plurality of sets of tokenized capability data.

Clause 5. The system of clause 1 or any other clause herein, wherein the at least one hardware processor is further configured to: generate a plurality of entity matching scores individually corresponding to the plurality of users; and generate a plurality of overall scores for each of the plurality of users based on the plurality of entity matching scores and the plurality of the plurality of similarity scores.

Clause 6. The system of clause 5 or any other clause herein, wherein the at least one hardware processor is further configured to generate the ranking of the plurality of users for the particular asset according to the plurality of overall scores.

Clause 7. The system of clause 1 or any other clause herein, wherein the at least one hardware processor is further configured to generate an asset vector for the particular asset based on the requirement data by applying the artificial intelligence model to the requirement data.

Clause 8. The system of clause 1 or any other clause herein, wherein the at least one hardware processor is further configured to generate a ranking of the plurality of users for the particular asset based on the plurality of similarity scores by generating a compatibility ranking using a large language model.

Clause 9. The system of clause 8 or any other clause herein, wherein the compatibility ranking further comprises a ranking of the plurality of users and a generated description for each of the plurality of sets of capability data.

Clause 10. The system of clause 8 or any other clause herein, wherein the artificial intelligence model further comprises a Longformer model.

Clause 11. A method, comprising: receiving, via one of one or more computing devices, a plurality of sets of capability data individually describing one of a plurality of users; applying, via one of the one or more computing devices, an artificial intelligence model to the plurality of sets of capability data to generate a plurality of sets of vectors individually representing a respective one of the plurality of sets of capability data; generating, via one of the one or more computing devices, a plurality of summary vectors individually corresponding to a particular set of the plurality of sets of capability data; receiving, via one of the one or more computing devices, requirement data associated with a particular asset; generating, via one of the one or more computing devices, an asset vector for the particular asset based on the requirement data; determining, via one of the one or more computing devices, a plurality of similarity scores individually based on a comparison of a corresponding summary vector of the plurality of summary vectors to the asset vector; and generating, via one of the one or more computing devices, a ranking of the plurality of users for the particular asset based on the plurality of similarity scores.

Clause 12. The method of clause 11 or any other clause herein, further comprising generating the ranking by generating a compatibility ranking using a large language model comprising a ranking of the plurality of users and a generated description for each of the plurality of sets of capability data.

Clause 13. The method of clause 12 or any other clause herein, wherein the artificial intelligence model further comprises a Longformer model.

Clause 14. The method of clause 11 or any other clause herein, further comprising generating at least one contextual embedding from a particular capability data of the plurality of sets of capability data.

Clause 15. The method of clause 11 or any other clause herein, further comprising: generating, via one of the one or more computing devices, a plurality of entity matching scores individually corresponding to the plurality of users; generating, via one of the one or more computing devices, a plurality of overall scores for each of the plurality of users based on the plurality of entity matching scores and the plurality of the plurality of similarity scores; and generating, via one of the one or more computing devices, the ranking of the plurality of users for the particular asset according to the plurality of overall scores.

Clause 16. The method of clause 11 or any other clause herein, further comprising generating, via one of the one or more computing devices, an asset vector for the particular asset based on the requirement data by applying the artificial intelligence model to the requirement data.

Clause 17. A non-transitory computer-readable medium embodying a program that, when executed by at least one computing device, causes the at least one computing device to: receive a plurality of sets of capability data individually describing one of a plurality of users; apply an artificial intelligence model to the plurality of sets of capability data to generate a plurality of sets of vectors individually representing a respective one of the plurality of sets of capability data; generate a plurality of summary vectors individually corresponding to a particular set of the plurality of sets of capability data; receive requirement data associated with a particular asset; generate an asset vector for the particular asset based on the requirement data; determine a plurality of similarity scores individually based on a comparison of a corresponding summary vector of the plurality of summary vectors to the asset vector; and generate a ranking of the plurality of users for the particular asset based on the plurality of similarity scores.

Clause 18. The non-transitory computer-readable medium of clause 17 or any other clause herein, wherein program further causes the at least one computing device to modify a particular set of the plurality of sets of vectors based on context of at least one surrounding tokens.

Clause 19. The non-transitory computer-readable medium of clause 17 or any other clause herein, wherein program further causes the at least one computing device to generate a plurality of sets of tokenized capability data by applying a tokenizer algorithm to the plurality of sets of capability data; and generate a respective plurality of token vectors for each set of the plurality of sets of tokenized capability data, wherein each summary vector of the plurality of summary vectors correspond to an average of the plurality of token vectors for a respective set of the plurality of sets of tokenized capability data.

Clause 20. The non-transitory computer-readable medium of clause 17 or any other clause herein, wherein program further causes the at least one computing device to generate a plurality of entity matching scores individually corresponding to the plurality of users; and generate a plurality of overall scores for each of the plurality of users based on the plurality of entity matching scores and the plurality of the plurality of similarity scores.

The examples were chosen and described in order to explain the principles of the claimed innovations and their practical application so as to enable others skilled in the art to utilize the innovations and various examples and with various modifications as are suited to the particular use contemplated. Alternative examples will become apparent to those skilled in the art to which the claimed innovations pertain without departing from their spirit and scope. Accordingly, the scope of the claimed innovations is defined by the appended claims rather than the foregoing description and the examples described therein.

What is claimed:
1. A system, comprising:
  a memory device; and
  at least one hardware processor coupled to the memory device, wherein the at least one hardware processor is configured to:
    receive a plurality of sets of capability data individually describing one of a plurality of users;
    apply an artificial intelligence model to the plurality of sets of capability data to generate a plurality of sets of vectors individually representing a respective one of the plurality of sets of capability data;
    generating a plurality of summary vectors individually corresponding to a particular set of the plurality of sets of capability data;

receive requirement data associated with a particular asset;
generate an asset vector for the particular asset based on the requirement data;
determine a plurality of similarity scores individually based on a comparison of a corresponding summary vector of the plurality of summary vectors to the asset vector; and
generate a ranking of the plurality of users for the particular asset based on the plurality of similarity scores.

2. The system of claim 1, wherein the plurality of similarity scores comprise a plurality of cosine similarity scores.

3. The system of claim 1, wherein the at least one hardware processor is further configured to apply the artificial intelligence model by:
generating a plurality of sets of tokenized capability data by applying a tokenizer algorithm to the plurality of sets of capability data; and
generating a respective plurality of token vectors for each set of the plurality of sets of tokenized capability data.

4. The system of claim 3, wherein each summary vector of the plurality of summary vectors correspond to an average of the plurality of token vectors for a respective set of the plurality of sets of tokenized capability data.

5. The system of claim 1, wherein the at least one hardware processor is further configured to:
generate a plurality of entity matching scores individually corresponding to the plurality of users; and
generate a plurality of overall scores for each of the plurality of users based on the plurality of entity matching scores and the plurality of the plurality of similarity scores.

6. The system of claim 5, wherein the at least one hardware processor is further configured to generate the ranking of the plurality of users for the particular asset according to the plurality of overall scores.

7. The system of claim 1, wherein the at least one hardware processor is further configured to generate an asset vector for the particular asset based on the requirement data by applying the artificial intelligence model to the requirement data.

8. The system of claim 1, wherein the at least one hardware processor is further configured to generate a ranking of the plurality of users for the particular asset based on the plurality of similarity scores by generating a compatibility ranking using a large language model.

9. The system of claim 8, wherein the compatibility ranking further comprises a ranking of the plurality of users and a generated description for each of the plurality of sets of capability data.

10. The system of claim 8, wherein the artificial intelligence model further comprises a Longformer model.

11. A method, comprising:
receiving, via one of one or more computing devices, a plurality of sets of capability data individually describing one of a plurality of users;
applying, via one of the one or more computing devices, an artificial intelligence model to the plurality of sets of capability data to generate a plurality of sets of vectors individually representing a respective one of the plurality of sets of capability data;
generating, via one of the one or more computing devices, a plurality of summary vectors individually corresponding to a particular set of the plurality of sets of capability data;
receiving, via one of the one or more computing devices, requirement data associated with a particular asset;
generating, via one of the one or more computing devices, an asset vector for the particular asset based on the requirement data;
determining, via one of the one or more computing devices, a plurality of similarity scores individually based on a comparison of a corresponding summary vector of the plurality of summary vectors to the asset vector; and
generating, via one of the one or more computing devices, a ranking of the plurality of users for the particular asset based on the plurality of similarity scores.

12. The method of claim 11, further comprising generating the ranking by generating a compatibility ranking using a large language model comprising a ranking of the plurality of users and a generated description for each of the plurality of sets of capability data.

13. The method of claim 12, wherein the artificial intelligence model further comprises a Longformer model.

14. The method of claim 11, further comprising generating at least one contextual embedding from a particular capability data of the plurality of sets of capability data.

15. The method of claim 11, further comprising:
generating, via one of the one or more computing devices, a plurality of entity matching scores individually corresponding to the plurality of users;
generating, via one of the one or more computing devices, a plurality of overall scores for each of the plurality of users based on the plurality of entity matching scores and the plurality of the plurality of similarity scores; and
generating, via one of the one or more computing devices, the ranking of the plurality of users for the particular asset according to the plurality of overall scores.

16. The method of claim 11, further comprising generating, via one of the one or more computing devices, an asset vector for the particular asset based on the requirement data by applying the artificial intelligence model to the requirement data.

17. A non-transitory computer-readable medium embodying a program that, when executed by at least one computing device, causes the at least one computing device to:
receive a plurality of sets of capability data individually describing one of a plurality of users;
apply an artificial intelligence model to the plurality of sets of capability data to generate a plurality of sets of vectors individually representing a respective one of the plurality of sets of capability data;
generate a plurality of summary vectors individually corresponding to a particular set of the plurality of sets of capability data;
receive requirement data associated with a particular asset;
generate an asset vector for the particular asset based on the requirement data;
determine a plurality of similarity scores individually based on a comparison of a corresponding summary vector of the plurality of summary vectors to the asset vector; and
generate a ranking of the plurality of users for the particular asset based on the plurality of similarity scores.

18. The non-transitory computer-readable medium of claim 17, wherein program further causes the at least one computing device to modify a particular set of the plurality of sets of vectors based on context of at least one surrounding tokens.

19. The non-transitory computer-readable medium of claim 17, wherein program further causes the at least one computing device to:
- generate a plurality of sets of tokenized capability data by applying a tokenizer algorithm to the plurality of sets of capability data; and
- generate a respective plurality of token vectors for each set of the plurality of sets of tokenized capability data, wherein each summary vector of the plurality of summary vectors correspond to an average of the plurality of token vectors for a respective set of the plurality of sets of tokenized capability data.

20. The non-transitory computer-readable medium of claim 17, wherein program further causes the at least one computing device to:
- generate a plurality of entity matching scores individually corresponding to the plurality of users; and
- generate a plurality of overall scores for each of the plurality of users based on the plurality of entity matching scores and the plurality of the plurality of similarity scores.

\* \* \* \* \*